(No Model.)
W. H. THAYER.
Universal Tool.
No. 241,893. Patented May 24, 1881.
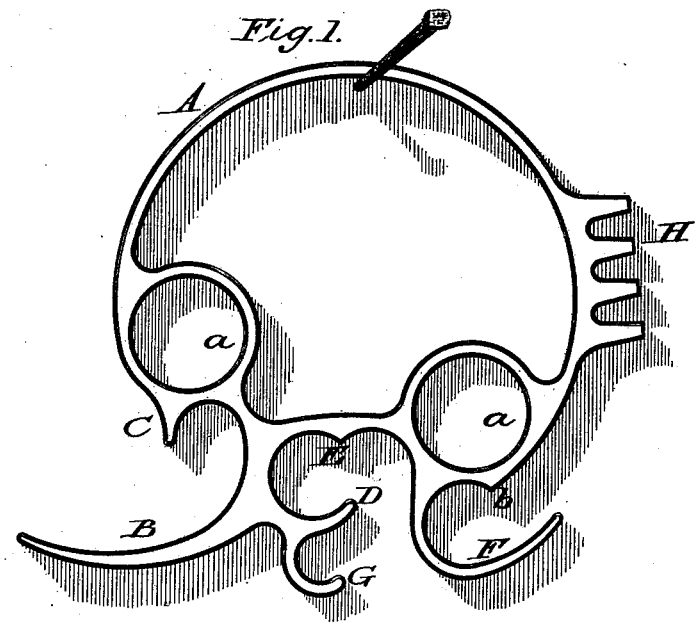
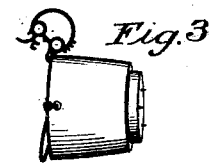
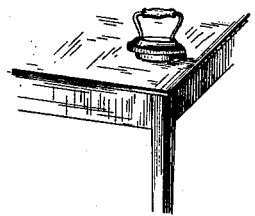
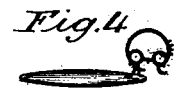
Attest:
Sidney P. Hollingsworth
Walter F. Dodge
Inventor.
W. H. Thayer
By Dodge & Son
Attys.

UNITED STATES PATENT OFFICE.

WILLIAM H. THAYER, OF CLEVELAND, OHIO.

UNIVERSAL TOOL.

SPECIFICATION forming part of Letters Patent No. 241,893, dated May 24, 1881.

Application filed December 22, 1880. (No model.)

*To all whom it may concern:*

Be it known that I, WILLIAM HENRY THAYER, of Cleveland, in the county of Cuyahoga and State of Ohio, have invented certain Improvements in Universal Tools, of which the following is a specification.

My invention relates to implements for handling stove-lids, pots, dishes, and kitchen utensils generally, the device being also adapted for use as a support for flat-irons, coffee-pots, &c., and as a meat-tenderer.

The invention consists in a circular bail or handle having parallel flat faces and furnished with various hooks and projections and with finger-holes, as hereinafter described.

In the accompanying drawings, Figure 1 represents a face elevation of my improved device, and the remaining figures represent the same applied to some of its uses.

The object of my invention is to produce a simple, cheap, and efficient implement for kitchen use, by which the various utensils therein employed may be readily lifted, carried, and manipulated as desired, and which shall be otherwise useful. To this end I produce, by casting or otherwise, the device more clearly represented in Fig. 1, consisting of a circular bail or hand-piece, A, provided with a hole or holes, $a$, to receive one or more fingers of the user, and provided also with hooks and projections, which I will proceed to describe, first calling attention, however, to the fact that owing to the bail form of the implement the weight of any article lifted by it is brought very close to or directly under the hand, where it may be sustained to the greatest advantage, instead of being received at the outer extremity of the hand-piece, as usual.

Referring now to the drawings, A represents the circular bail or handle, provided preferably with two holes, $a$, into one or the other of which the forefinger is inserted, according to the particular use to which the implement is applied, and further provided with a horn, B, of proper length and form for lifting stove-lids, as in Fig. 3. Above the horn B and inward from the end thereof is formed a lug or projection, C, which, in connection with the horn B, serves the purpose of lifting pie-plates and similar shallow dishes, the horn being first passed under the plate and the lug C then raised and hooked over its upper edge, as shown in Fig. 2.

To adapt the implement to the carrying of pots, kettles, and similar vessels, a hook, D, is formed on the under side thereof, midway between the finger-holes $a$ or at such point that the weight shall fall directly beneath the hand in which the bail or handle A is held. Directly above the nose of hook D there is formed a projection, E, sufficient space being left between the two to admit the bail or handle of a tea-kettle or like utensil. The bail or handle of said utensil being passed into the space between the hook D and projection E, the bail or handle A, which stands at right angles to that of the kettle, is tipped laterally or in the direction of the length of the kettle-bail, thereby cramping the latter and forming a convenient means of tipping the kettle for pouring its contents or for other purposes. For the purpose of tipping pots and similar vessels a hook, F, extends outward from the opposite side of the implement from that at which the horn B is located, and in the reverse direction, and above said hook is formed a shoulder, $b$. By engaging the hook F over the edge of the vessel, as shown in Fig. 3, and tipping the implement forward, the latter is caused to take hold firmly upon the vessel, which may be tipped thereby as desired. In a similar manner the nose of hook D and the rear side of hook F may be employed for lifting and carrying an ash-pan, while for carrying pudding-dishes and the like a second hook, G, is formed directly beneath hook D to engage over the inner edge of the vessel, while the under side of hook F bears against the outside.

H represents a series of teeth or studs formed upon one side of the bail or handle A, and serving the office of a meat-tenderer.

The faces of the implement being flat and parallel, it will be seen that it may be used as a flat-iron stand, as in Fig. 5, or as a support for tea or coffee pots, or for analogous purposes.

By providing the implement with the finger-holes $a$ the user is enabled to hold it in any position desired without danger of slipping or turning in the hand.

It is apparent that some of the hooks may be used independently of others, and that the teeth or studs H may be omitted if desired. It is however preferred to construct the device as shown.

I am aware that a lifter having a straight wooden handle applied to its bail has been provided with a hook directly below the handle, and that a spring-wire plate-lifter has been formed with finger-holes. It is however to be noted that in my device a circular bail is employed, thereby permitting any one of the several horns or hooks to be brought directly below the hand, a finger being passed through the appropriate finger-hole to bring such horn or hook to the desired position.

Having thus described my invention, what I claim is—

1. In an implement for kitchen use, a circular bail provided with two or more hooks or horns for manipulating kitchen utensils, the circular form of the bail causing the implement to hang naturally and easily in the hand in using each of the several hooks or horns.

2. In a kitchen implement, a circular bail or handle provided with one or more hooks or horns for manipulating kitchen utensils and with one or more finger-holes whereby the bail may be held in any desired position.

3. The herein-described implement for kitchen use, consisting of the bail A, having one or more holes, $a$, and provided with horn B, hooks D F G, projections C E, shoulder $b$, and teeth H, as shown.

4. A curved or bail-shaped implement for handling kitchen utensils having parallel flat faces, as described, whereby it is adapted for use as a stand for flat-irons and other utensils.

WILLIAM HENRY THAYER.

Witnesses:
JOSEPH TAYLOR,
SPENCER LOVE.